H. D. BROWN.
BEET TOPPER.
APPLICATION FILED JUNE 30, 1916.

1,225,759.

Patented May 15, 1917.

Inventor:
Homer D. Brown
By George W. Romney
Atty.

UNITED STATES PATENT OFFICE.

HOMER D. BROWN, OF OGDEN, UTAH.

BEET-TOPPER.

1,225,759.             Specification of Letters Patent.    Patented May 15, 1917.

Application filed June 30, 1916. Serial No. 106,869.

*To all whom it may concern:*

Be it known that I, HOMER D. BROWN, a citizen of the United States, and a resident of the city of Ogden, in the county of Weber, State of Utah, have invented certain new and useful Improvements in Beet-Toppers, of which the following is a specification.

This invention relates broadly to agricultural implements and more specifically to a device for topping beets.

The principal object of the present invention is to provide a mechanism for topping beets prior to their being plowed from the ground.

A further object of the present invention is to provide a beet topper including a plurality of knives constructed to cut sections from the tops of beets while the beets are still retained in the earth.

A still further and more specific object of the present invention is to provide a flexibly joined frame-work constructed to carry a plurality of knives whereby the knives successively engage and cut sections from the tops of the beets so that the depth of each section cut will be substantially independent of the condition of the surface of the ground.

A still further and more specific object of the present invention is to provide a plurality of bars connected together by flexible chain sections with certain of said bars carrying horizontally arranged cutting knives and a rigid frame to which said bars are connected by means of flexible connections.

Still further and other objects of the present invention will in part be obvious and will in part be pointed out hereinafter by reference to the accompanying drawings forming a part of this specification and throughout which like characters are used to represent like parts.

Figure 1:
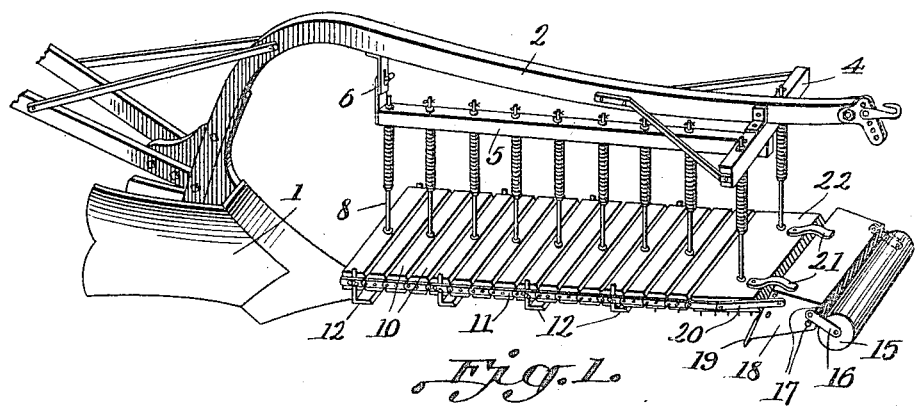
Figure 2:
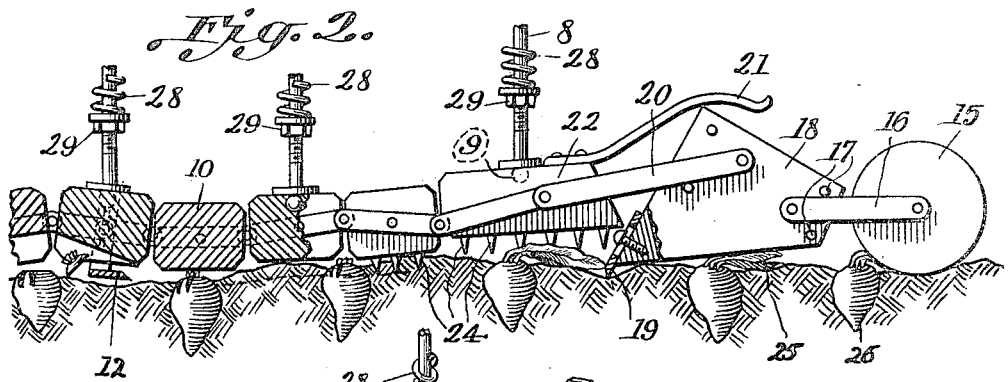
Figure 3:
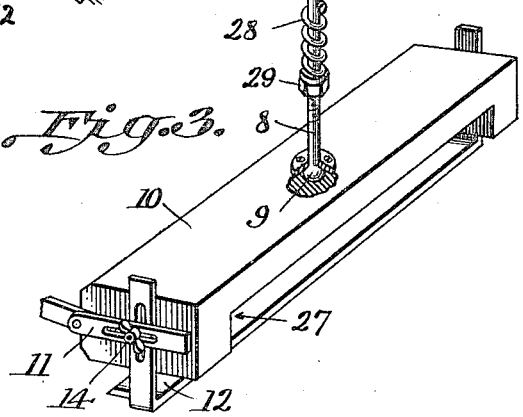
Figure 4:
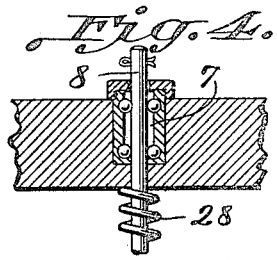

Figure 1 is a view illustrating one mode of attaching my invention to a plow. Fig. 2 is a detail view illustrating the relation sustained between the device and the earth during the operation of the implement. Fig. 3 is a detail view of one of the bars carrying a knife. Fig. 4 is a detail view of one form of bearing which may be utilized in connecting a supporting rod to the rigid carrying frame.

In the preparation of beets for certain markets, particularly where the beets are to be used in the beet sugar industry it is desirable, in fact it is substantially necessary to top the beets, that is to separate the leaves from the bulbous portion of the plant. It has been found that this topping operation may be successfully carried out by cutting the tops from the beets before the beets are removed from the earth. To successfully perform the operation of topping it is necessary that about one inch of the body or bulbous portion should be removed in order to remove the entire leaf crown. Beets are usually grown in loose soil so that if it is attempted to remove this entire amount at one cutting, the beet is liable to be pulled out of the earth and be disengaged from the topping device thereby leaving the beet untopped.

To accomplish the preceding desideratum without encountering the difficulty specified, I have provided a beet topping device which preferably is attached to some part, for example the beam of the digger or plow whereby the beets are topped and successively sliced to remove the desired amount of the leaf crown.

More particularly my invention is preferably embodied in a construction comprising a plurality of bars arranged transverse the path or travel of the machine, and which bars are flexibly connected together at their ends by means of flat sectioned chains. At the front end of the device and preceding the section comprising the connected bars is provided a drag, which carries a scraper knife on its rear edge, and preceding the drag I preferably provide a roller carried upon pivoted links whereby it may rise and lower with reference to the drag to accommodate inequalities in the ground. The section or bar immediately back of the drag is somewhat wider in the preferred form than the bars forming the body member of the device, and this bar preferably carries on its under side a plurality of depending spikes or points. Spikes or points may also be provided upon other members of the implement as illustrated in Fig. 1. The wide section carries a pair of leaf springs which extend over the drag section and maintain the scraper knife pressed firmly against the earth when the machine is in operation. The main body of the device comprising the flexibly connected bars, is arranged to carry at intervals adjustably mounted horizontally extending topping blades, in such manner that each blade cuts a slice or section from the tops of the beets.

Various forms of construction may be utilized to attach this operative part of the implement to a suitable carrying or draft frame. In the preferred form of my invention I provide a plurality of vertical rods which are connected at their lower ends by a ball and socket universal joint and which extend at their upper ends through wide bearings provided in a carrying or draft frame which may be supported directly upon a plow beam. Obviously if the plow beam is not of sufficient length a supplemental beam may be provided and secured to the plow beam. These vertical rods carry compression springs constructed to be adjusted so as to continuously press downward on the body of the device and maintain the cutting features of the tool in intimate connection with the earth. At the same time it is to be noted that each connecting rod acts independently of its neighbor so that the entire device is flexible to accommodate itself to the unevenness of the ground.

Referring now particularly to the drawing, the plow 1 includes the usual plow beam 2 to which is secured a cross piece 4 and a frame member 5 that is adjustably connected as at 6 with the plow beam 2. This cross piece and frame member carry bearings, which may be ball bearings 7 in which vertically slidable rods 8 are adapted to be supported. These vertically slidable rods are connected by means of a ball and socket universal joint 9 with cross drag bars 10. These cross drag bars may be of wood or any suitable material and are connected together by means of flat plate links 11. Preferably each flat plate is pivotally connected with the end of a drag bar 10 and the pivots of the links are arranged to coincide with the spaces between the drag bars, in order to insure unhampered flexibility of the drag bars. Certain of the drag bars 10 carry topping blades 12 which may be adjustably mounted upon a thumb screw adjustment 14. The forward end of the device comprises a roller 15 which is mounted between pivoted links 16, which may oscillate between stop pins 17 and which roller bends the leaves of the beets forwardly to expose the leaf crown to the successively cutting and removing devices. The pivoted links 16 are secured to a heavy drag bar 18 which is provided on its rear edge with a scraper blade 19. This blade may be mounted in various ways, but preferably it is adjusted to accommodate for wear and to permit the blade to be removed for sharpening. The drag bar 18 is also mounted upon pivoted links such as 20 and is held in contact with the earth by means of flexible leaf springs 21 that are carried upon a wide cross bar 22. This wide cross bar carries on its under surface a plurality of sharp pointed spikes 24 which cut down into the leaf crown and enable the topping blades to more easily remove the tops of the beets.

In the operation of the device as the plow is drawn forward by a team or suitable motive power, the roller 15 encounters and bends over the leaves 25 of the beets 26. While in this bent condition the leaves pass under the heavy drag bar 18 and are caught by the scraper blade 19 which removes parts of the leaves, and at the same time gives a permanent bend or set to the leaves which are bent over. The spikes 24 cut down into the top of the beet and through the leaves and further assist in tearing up and removing the leaves from the top of the beet. The first cutting knife or blade slices a section from the upper part of the beet, which section passes through the recess or opening 27 which is provided in the bars adjacent the cutting knives. The succeeding cutting knife removes a further slice. The bars 10 are forced against the tops of the beets by the coiled springs 28 carried by the rods 8 and adjustable as to strength by the nuts 29. This construction provides for successful operation of the device over uneven or broken ground. This process of removing sections by succeeding knives continues until the device has passed over the beet, and at which time approximately one inch has been cut from the crown of the beet so that when the plow 1 removes or plows out the beet the bulbous part of the plant is entirely free from the leaf or leaf crown. The beets in this condition are now ready for market, and the topping operation has been performed automatically as a step in the harvesting or plowing up of the beets.

Having thus described my invention, what I claim is:—

1. In a device of the class described in combination a supporting frame, a plurality of bars beneath said supporting frame, flexible connections uniting the ends of said bars, horizontal blades carried by certain of said bars, and means connecting said bars with said frame.

2. In a beet topping machine in combination a plurality of bars, flexible means secured to the ends of said bars for flexibly connecting said bars together to constitute a drag, topping knives carried by certain of said bars, and means for dragging said bars over the earth to enable said knives to cut the tops from the beets.

3. In a beet topping machine in combination a plurality of transversely extending wooden bars, means for flexibly connecting said bars together, a topping blade carried by one of said bars, and means for forcing said topping blade into contact with beets to top said beets prior to their being removed from the earth.

4. In a beet topping machine in combination a supporting frame, a plurality of transversely arranged drag bars beneath said supporting frame, a topping blade carried by one of said bars, means for flexibly connecting said bars together and resilient means for connecting said bars to said supporting frame whereby said bars may have an undulatory motion in passing over uneven ground, substantially as described.

5. In a beet topping device in combination, a flexible frame-work, a beet topping blade carried by said frame work, a draft frame and means connecting said frame-work with said draft frame in such manner as to maintain said beet topping blade in contact with the earth to enable said blade to cut the tops from beets when said device is operated in the manner described.

6. In a beet topping machine in combination a flexible frame, a roller adapted to engage and bend forward the tops of beets, a scraper blade following said roller and constructed to engage the bent over tops, a drag bar, a plurality of spikes beneath said drag bar, said spikes being constructed to serrate the tops of the beets, and a topping blade constructed to cut a section from the serrated tops of said beets.

7. In a beet topping machine in combination, a draft frame, a flexible frame, means connecting said draft frame and said flexible frame, and a plurality of topping knives carried by said flexible frame.

8. In a beet topping machine in combination, a draft frame, a flexible frame beneath said draft frame, means connecting said flexible frame with said draft frame in such manner as to permit universal movement of said flexible frame relative to said draft frame, and a plurality of topping blades carried by said flexible frame, said topping blades being arranged in such manner as to cut successive slices from the tops of the beets.

9. In a beet topping machine in combination, a flexible frame-work comprising transverse members and longitudinal flexible members joining said transverse members, a plurality of cutting knives carried by said transverse members and means whereby said transverse members may be dragged over the earth to cause said cutting blades to engage and cut off the tops of the beets.

10. In a device of the class described in combination, a roller, a flexible frame-work, a plurality of cutting blades carried by said frame-work and means for dragging said roller and said frame-work over the earth in such manner that said blades will cut the tops from the beets.

11. In a beet topping machine in combination, a roller, a scraping blade following said roller, spring members for maintaining said scraping blade in contact with the earth, a member provided on its under surface with a plurality of spikes, a frame-work, a topping blade carried by said frame-work, and means to enable the device to be dragged over the earth whereby the tops may be cut from the beets.

12. In a beet topping machine in combination, a plow beam, a supporting frame constructed to be carried by said plow beam, a frame-work beneath said supporting frame, a cutting knife carried by said frame-work, and flexible means connecting said supporting frame with said frame-work.

13. In a beet topping machine in combination, a plow beam, a plow attached to said plow beam, a supporting frame carried by said plow beam, a flexible frame beneath said supporting frame, a plurality of beet topping blades carried by said flexible frame, and means connecting said flexible frame to said supporting frame.

14. In a beet topping machine in combination, a plow beam, a supporting frame secured to and carried by said plow beam, a plurality of drag bars transversely arranged beneath said plow beam, topping blades carried by certain of said bars, and flexible means connecting said bars and said supporting frame.

15. In a beet topping machine in combination, a plow beam, a supporting frame carried by and beneath said plow beam, a frame-work beneath said supporting frame, said frame-work carrying a roller, a scraping blade following said roller, a plurality of topping blades following said scraping blade, spring members connecting said frame-work and said supporting frame, substantially as described.

HOMER D. BROWN.

Copies of this patent may be obtained for five cents each, by addressing the "Commissioner of Patents, Washington, D. C."